(12) United States Patent  
Ikeda et al.

(10) Patent No.: US 8,771,624 B2  
(45) Date of Patent: Jul. 8, 2014

(54) CATALYST FOR PURIFYING EXHAUST GAS FROM INTERNAL COMBUSTION ENGINE AND PROCESS FOR PURIFYING EXHAUST GAS USING THE SAME

(75) Inventors: Masanori Ikeda, Himeji (JP); Hideki Goto, Himeji (JP); Kosuke Mikita, Himeji (JP)

(73) Assignees: Umicore Shokubai Japan Co., Ltd, Osaka (JP); Umicore Shokubai USA Inc., Auburn Hills, MI (US)

( * ) Notice: Subject to any disclaimer, the term of this patent is extended or adjusted under 35 U.S.C. 154(b) by 70 days.

(21) Appl. No.: 12/922,708

(22) PCT Filed: Mar. 13, 2009

(86) PCT No.: PCT/JP2009/054917  
§ 371 (c)(1),  
(2), (4) Date: Sep. 15, 2010

(87) PCT Pub. No.: WO2009/116468  
PCT Pub. Date: Sep. 24, 2009

(65) Prior Publication Data  
US 2011/0027155 A1    Feb. 3, 2011

(30) Foreign Application Priority Data  
Mar. 19, 2008    (JP) ................. 2008-071867

(51) Int. Cl.  
*B01D 53/56* (2006.01)  
*B01D 53/94* (2006.01)  
*B01J 8/02* (2006.01)  
*C01B 21/00* (2006.01)  
*C01B 23/00* (2006.01)  
*C01B 25/00* (2006.01)  
*C01B 31/00* (2006.01)  
*C01B 33/00* (2006.01)  
*C01B 35/00* (2006.01)  
*C01G 28/00* (2006.01)  
*C01G 30/00* (2006.01)  
*B01J 29/06* (2006.01)  
*B01J 29/18* (2006.01)  
*B01J 20/00* (2006.01)  
*B01J 21/00* (2006.01)  
*B01J 21/04* (2006.01)  
*B01J 23/00* (2006.01)  
*B01J 23/02* (2006.01)  
*B01J 23/06* (2006.01)  
*B01J 23/08* (2006.01)  
*B01J 23/10* (2006.01)  
*B01J 23/40* (2006.01)  
*B01J 23/42* (2006.01)  
*B01J 23/44* (2006.01)  
*B01J 23/58* (2006.01)  
*B01J 23/63* (2006.01)  
*B01J 37/02* (2006.01)  
*F01N 3/28* (2006.01)  
*B01J 37/00* (2006.01)

(52) U.S. Cl.  
CPC *B01J 23/58* (2013.01); *B01J 23/44* (2013.01); *B01D 2255/1025* (2013.01); *B01D 2255/1023* (2013.01); *B01J 37/0215* (2013.01); *B01J 23/63* (2013.01); *B01D 2255/407* (2013.01); *F01N 3/28* (2013.01); *B01D 53/944* (2013.01); *B01D 2258/014* (2013.01); *B01D 2255/2047* (2013.01); *B01J 37/0036* (2013.01)  
USPC ............. 423/213.5; 502/65; 502/66; 502/73; 502/74; 502/87; 502/242; 502/252; 502/262; 502/263; 502/302; 502/303; 502/304; 502/326; 502/327; 502/328; 502/333; 502/334; 502/339; 502/340; 502/341; 502/349; 502/350; 502/351; 502/355; 502/415; 502/439

(58) Field of Classification Search  
USPC ......... 502/252, 262, 304, 326–328, 333, 334, 502/339–341, 349–351, 355, 415, 439, 65, 502/66, 73, 74, 87, 242, 263, 302, 303; 423/213.5  
See application file for complete search history.

(56) References Cited

U.S. PATENT DOCUMENTS

| | | | |
|---|---|---|---|
| 4,675,308 A * | 6/1987 | Wan et al. | 502/304 |
| 4,749,671 A * | 6/1988 | Saito et al. | 502/64 |
| 4,791,091 A * | 12/1988 | Bricker et al. | 502/303 |
| 4,868,148 A * | 9/1989 | Henk et al. | 502/303 |
| 4,904,633 A * | 2/1990 | Ohata et al. | 502/304 |
| 5,015,617 A * | 5/1991 | Ohata et al. | 502/304 |
| 5,051,392 A * | 9/1991 | Mabilon et al. | 502/303 |
| 5,212,142 A * | 5/1993 | Dettling | 502/304 |
| 5,260,249 A * | 11/1993 | Shiraishi et al. | 502/304 |
| 5,597,771 A * | 1/1997 | Hu et al. | 502/304 |
| 5,884,473 A | 3/1999 | Noda et al. | |
| 5,911,961 A * | 6/1999 | Horiuchi et al. | 423/213.5 |
| 5,958,828 A | 9/1999 | Murakami et al. | |
| 5,981,427 A * | 11/1999 | Sung et al. | 502/325 |
| 5,989,507 A * | 11/1999 | Sung et al. | 423/213.5 |
| 6,087,298 A * | 7/2000 | Sung et al. | 502/333 |
| 6,143,691 A * | 11/2000 | Shiraishi et al. | 502/304 |
| 6,602,479 B2 * | 8/2003 | Taniguchi et al. | 423/239.1 |
| 6,777,370 B2 * | 8/2004 | Chen | 502/241 |
| 6,797,668 B2 * | 9/2004 | Yoshikawa | 502/304 |
| 7,740,817 B2 * | 6/2010 | Matsumoto et al. | 423/213.2 |
| 2001/0036433 A1 * | 11/2001 | Euzen et al. | 423/245.3 |
| 2001/0051122 A1 * | 12/2001 | Hori et al. | 423/213.5 |
| 2002/0103078 A1 * | 8/2002 | Hu et al. | 502/326 |
| 2003/0125202 A1 | 7/2003 | Ruwisch et al. | |
| 2004/0198595 A1 * | 10/2004 | Chen | 502/328 |
| 2005/0164879 A1 * | 7/2005 | Chen | 502/328 |
| 2008/0124264 A1 * | 5/2008 | Ikeda et al. | 423/213.5 |
| 2009/0170689 A1 * | 7/2009 | Hatanaka et al. | 502/50 |

FOREIGN PATENT DOCUMENTS

| | | |
|---|---|---|
| EP | 0507590 | 10/1992 |
| EP | 1020217 | 7/2000 |
| EP | 1316354 | 6/2003 |
| EP | 2000639 | 12/2008 |
| EP | 2127745 | 12/2009 |
| JP | 07-136512 | 5/1995 |
| JP | 09-000872 | 1/1997 |
| JP | 11-013462 | 1/1999 |
| JP | 2004-114014 | 4/2004 |
| JP | 2007-136327 | 6/2007 |

* cited by examiner

*Primary Examiner* — Cam N. Nguyen

(74) *Attorney, Agent, or Firm* — Cesari and McKenna, LLP

(57) ABSTRACT

An Object of the patent is to remove highly reducing hydrocarbon exhausted during acceleration period, and to remove efficiently hydrocarbon even after contacting with highly reducing hydrocarbon. By using a catalyst having a higher proportion of palladium having surface charge of 2-valence or 4-valence supported than that of 0-valence by supporting palladium together with magnesium oxide, hydrocarbon exhausted from an internal combustion engine especially during acceleration period can be efficiently removed.

14 Claims, 9 Drawing Sheets

CATALYST FOR PURIFYING EXHAUST GAS FROM INTERNAL COMBUSTION ENGINE AND PROCESS FOR PURIFYING EXHAUST GAS USING THE SAME

CROSS REFERENCE TO RELATED APPLICATIONS

This application is a National Stage of International Application No. PCT/JP2009/054917, filed on Mar. 13, 2009, which claims the priority of Japanese Application No. 2008-071867 filed Mar. 19, 2008. The contents of the prior applications mentioned above are incorporated herein by reference in its entirety.

TECHNICAL FIELD

The present invention relates to a catalyst for purifying an exhaust gas from an internal combustion engine and a process for purifying an exhaust gas using the catalyst. More particularly, it relates to a catalyst having excellent performance of purifying hydrocarbon/hydrocarbons (hereinafter referred to as "HC") contained in a highly reductive exhaust gas such as that exhausted from an internal combustion engine such as a gasoline engine especially at acceleration period, and a purifying process using the catalyst.

RELATED ART

As a means for removing hydrocarbon contained in a low-temperature exhaust gas when an internal combustion engine starts, an HC adsorbent such as zeolite has been used. An exhaust gas-purifying apparatus using a catalyst which comprises an element selected form the group consisting of platinum, magnesium, phosphorus, boron, magnesium and calcium incorporated in an HC adsorbent containing β-zeolite as a main component, in order to improve structural stability at a high temperature thereof, and to promote HC adsorption capability at a lower temperature and suppress HC desorption at an elevated temperature, has been disclosed in JP-A-11-013462.

Similarly, as a means for removing hydrocarbon contained in a low-temperature exhaust gas when an internal combustion engine starts, an exhaust gas-purifying catalyst which comprises zeolite as a HC adsorbent layer, an inorganic oxide having alkali metal and/or alkaline earth metal dispersed therein, and palladium has been disclosed in JP-A-2004-114014. The catalyst can remove the HC desorbed from the HC adsorbent layer. It further discloses that effects by the alkali element (improvement of stability) are imparted effectively and uniformly only to the catalyst component layer containing palladium, and the well-dispersed alkali element acts to prevent palladium particles from sintering each other.

An exhaust gas-purifying system has been disclosed in U.S. Pat. No. 5,884,473, in which a low temperature ignition catalyst composition containing an electron-donating and/or nitrogen dioxide adsorbing and releasing substance, such as magnesium, strontium and barium, and a noble metal, such as platinum, palladium and rhodium, and an adsorbent made of zeolite are provided in an exhaust gas pipe of an internal combustion engine. It states that electrons are donated from the electron-donating substance to the noble metal to decrease the adsorption force of HC and/or CO to the noble metal, by which reaction between HC and/or CO with $O_2$ is promoted.

U.S. Pat. No. 5,958,828 discloses that, with an exhaust gas purifying catalyst containing palladium and magnesium, the magnesium captures and adsorbs HC in an exhaust gas to suppress adsorption of HC onto the palladium.

JP-A-07-136512 discloses a catalyst prepared from an aqueous solution of a mixture of palladium and at least one of calcium hydroxide and magnesium hydroxide, wherein the calcium and magnesium reacts with a sulfur component to form a sulfide, thus suppressing sulfur poisoning on palladium.

JP-A-2007-136327 discloses a technology for suppressing metalation of palladium oxide using a composite oxide of lanthanoid oxide and palladium oxide, or a composite particle formed by contacting a plurality of lanthanoid oxide particles and palladium oxide particles.

DISCLOSURE OF THE INVENTION

None of the JP-A-11-013462, JP-A-2004-114014, U.S. Pat. No. 5,958,828, JP-A-07-136512 and JP-A-2007-136327, however, describe combustion and removal of hydrocarbon during acceleration period, and combustion behavior of hydrocarbon during acceleration period has been left unclear. Although U.S. Pat. No. 5,884,473 states that a large volume of an exhaust gas flows during acceleration period, it discloses no specific values in terms of combustion during acceleration period.

In engine acceleration period, a space velocity increases and the contact time between a catalyst and an exhaust gas becomes shorter, which makes combustion of hydrocarbon difficult. Further, since high concentration hydrocarbon is charged as a fuel during engine acceleration period, an A/F value (air-fuel ratio) is lower than a theoretical air-fuel ratio of 14.7. Specifically, a fuel containing a large amount of reducing hydrocarbon is supplied excessively, while amount of oxygen required for burning the hydrocarbon is small. Accordingly, reduction is easily caused on the palladium surface, which tends to make most of the palladium surface 0-valent. Such 0-valent palladium is unfavorable in removing hydrocarbon, and palladium in an oxidation state such as 2-valent and 4-valent palladium is preferable. However, none of the methods described in JP-A-11-013462, JP-A-2004-114014, and U.S. Pat. No. 5,884,473 describes a surface oxidation state or surface palladium valence. The term "surface oxidation state", as used herein, is referred to an oxidation state of atoms existing in a layer with 3 to 5 nm depth from the surface of a palladium particle. The surface oxidation state is important, because the atoms near the particle surface have stronger influences on reaction than those inside the particle.

Although U.S. Pat. No. 5,958,828 describes a sintering phenomenon due to reduction of palladium oxide (PdO), it does not disclose a concrete value indicating an oxidation state of palladium. It further describes that magnesium suppresses HC adsorption on palladium, but there is no description about combustion and removal behavior of hydrocarbon in acceleration period.

Likewise, although JP-A-07-136512 discloses a process for absorbing sulfur oxide using a catalyst prepared by a production method which comprises impregnating a support with an aqueous solution of a mixture of palladium and magnesium hydroxide, there is no description of a concrete value indicating a surface oxidation state of the palladium.

Similarly, although JP-A-2007-136327 discloses that heat resistance of palladium is improved by suppressing reduction of palladium oxide to metal palladium, there is no description about acceleration period nor about hydrocarbon removal performance. Further, the disclosed process uses a very expensive lanthanoid oxide. On the other hand, magnesium is an element with the 8th highest Clarke number, and there are many inexpensive raw materials.

According to conventional automobile exhaust gas regulations, it was possible to lower hydrocarbon emission below the standard without burning hydrocarbon during a particular period such as engine acceleration period, in which combustion of hydrocarbons was difficult. However, due to tightening of automobile exhaust gas regulations, it has become a problem to remove hydrocarbon also during acceleration period when a large amount of hydrocarbons are exhausted, and to suppress emission of the same. This derives another problem to satisfy the standard that the catalyst activity should be maintained even after a large amount of exhausted hydrocarbons is generated and the catalyst is exposed to a reducing gas.

The aforementioned problems can be solved by a catalyst for treating an exhaust gas from an internal combustion engine, which comprises a catalyst active component comprising at least both palladium and magnesium, wherein said palladium contains at least palladium having surface charge of 2-valence (bivalent) and/or 4-valence (tetravalent).

The problems can be solved also by a process for purifying an exhaust gas, which comprises treating hydrocarbon in the exhaust gas from an internal combustion engine including a reducing gas using the catalyst of the present invention.

By using a catalyst for purifying an exhaust gas of the present invention, palladium can be supported in an oxidation state where 2-valence and/or 4-valence is dominant over 0-valence. The catalyst has high combustion activity even on hydrocarbon in an exhaust gas from an internal combustion engine in acceleration period with an A/F value less than the theoretical air-fuel ratio.

The above and other objects, features and advantages of the present invention will become clear from the preferred embodiments exemplified in the following description and the accompanying drawings.

BEST MODE FOR CARRYING OUT THE INVENTION

Figure 1:
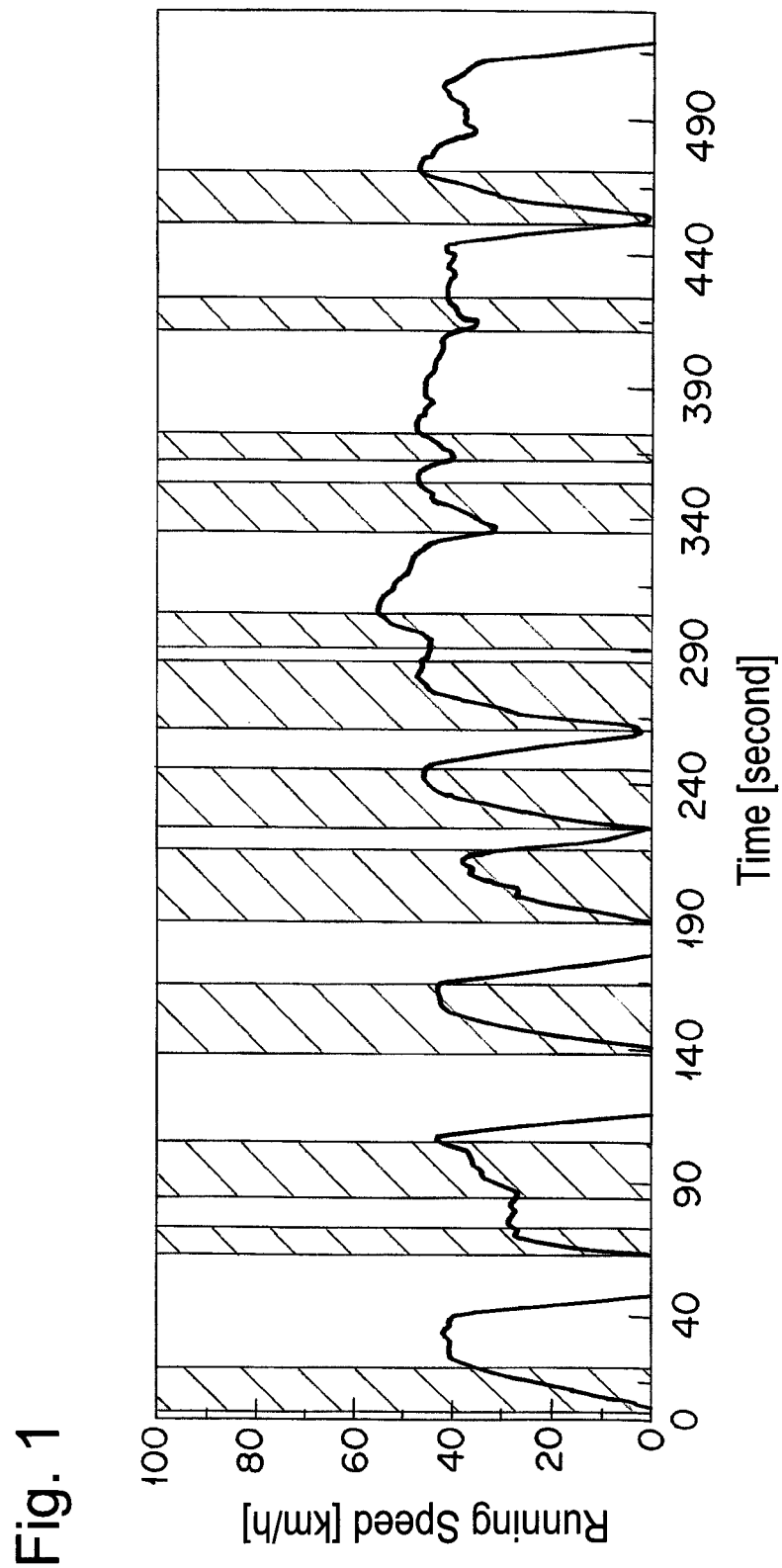
FIG. 1 is a graph showing a running speed of automobile.

Some embodiments of the present invention will now be described in more detail.

A catalyst for purifying an exhaust gas from an internal combustion engine of the present invention (hereinafter occasionally referred simply to as a "catalyst") comprises as an active catalyst ingredient at least both palladium and magnesium, wherein the palladium contains at least palladium having surface charge of 2-valence and/or 4-valence. This enables palladium to be supported in an oxidation state where 2-valence and/or 4-valence is dominant over 0-valence, and the catalyst can have high combustion activity even on hydrocarbon in an exhaust gas from an internal combustion engine in acceleration period with an A/F value less than a theoretical air-fuel ratio (14.7) containing high concentration of reducing hydrocarbon.

In the catalyst, the proportion of palladium having surface charge of 0-valence (=0-valence/(0-valence+2-valence+4-valence)) is preferably less than 0.5, and especially preferably 0.4 or less. As used herein, the term "proportion of palladium having surface charge of 0-valence" is referred to as a ratio of the number of 0-valent palladium atoms to the total number of 0-valent, 2-valent and 4-valent palladium atoms. More specifically, if the proportion is 0.5 or higher, the surface Pt valence would be occupied dominantly by 0-valent palladium, to make the hydrocarbon combustion activity low. Meanwhile, since a lower possible proportion of palladium having surface charge of 0-valence (=0-valence/(0-valence+2-valence+4-valence)) is preferable from the standpoint of removal of hydrocarbons, there is no particular lower limit. Generally, the preferable lower limit of the proportion of palladium having surface charge of 0-valence (=0-valence/(0-valence+2-valence+4-valence)) is 0. So long as the proportion is equal to or higher than the lower limit, it is quite possible to support palladium in an oxidation state where 2-valence and/or 4-valence is dominant over 0-valence. Consequently, the catalyst can exhibit high combustion activity on hydrocarbons in an exhaust gas from an internal combustion engine which contains a large amount of reducing hydrocarbon having an A/F value in acceleration period less than a theoretical air-fuel ratio (14.7). There is no particular restriction on the ratio between 2-valence and 4-valence, and it can be selected appropriately. The proportion of palladium having each surface charge can be measured by a conventional method. In the present description, the proportion of palladium having a surface charge is measured by X-ray Photoelectron Spectroscopy (XPS).

Although palladium and magnesium, as the catalyst active components, may be used as they are, they are preferably supported on a three-dimensional structure, and more preferably supported together with a refractory inorganic oxide powder. The refractory inorganic oxide powder is preferably supported on a three-dimensional structure, but palladium and magnesium as the catalyst active components, and another catalyst active component such as a noble metal may be partly supported on the refractory inorganic oxide. Consequently, the catalyst of the present invention preferably further comprises a refractory inorganic oxide powder. When the catalyst active components are supported on a three-dimensional structure, there is no particular restriction on the amount of the supported palladium. The amount of the supported palladium (in terms of Pd) is preferably 0.05 to 20 g, and more preferably 0.1 to 10 g, based on 1 liter (hereinafter occasionally abbreviated as "L") of the three-dimensional structure. When the catalyst active components are supported on a three-dimensional structure, magnesium is supported usually in a form of magnesium oxide. The amount of supported magnesium (in terms of MgO) is preferably 0.1 to 100 g, and more preferably 0.5 to 50 g, based on 1 L of the three-dimensional structure, though it is not particularly limited thereto. When the catalyst of the present invention additionally comprises a refractory inorganic oxide and the refractory inorganic oxide is supported on a three-dimensional structure, the amount of the supported refractory inorganic oxide is preferably 10 to 300 g, and more preferably 30 to 150 g, based on 1 L of the three-dimensional structure, though it is not particularly limited thereto.

If the amount of supported palladium is lower than the aforementioned range, combustion of hydrocarbons would not proceed adequately. On the other hand, if it is higher than the aforementioned range, the HC combustion activity would not increase for the amount, and the cost performance would occasionally decline due to the use of a larger amount of the expensive noble metal. If the amount of magnesium is lower than the aforementioned range, the effects obtained by palladium while keeping the surface thereof in a 2-valent or 4-valent oxidation state would decrease. On the other hand, if it is higher than the aforementioned range, magnesium would tend to cover palladium particles and another catalyst active component.

With respect to locations of supporting palladium and magnesium, palladium and magnesium are preferably closely situated, and more preferably, palladium and magnesium are at least partly in contact state. The expression "palladium and magnesium are at least partly in contact state" includes a state where palladium covers magnesium, or a state where magnesium covers palladium, as well as a state where palladium and magnesium are partly in contact with each other. Preferably, palladium and magnesium are partly in contact with each other, or palladium covers magnesium. Further, palladium and magnesium can be located closely within the distance of several nm, even if they are not partly in contact. By such supporting state, the palladium can be supported with surface thereof in an oxidation state where 2-valence and/or 4-valence is dominant over 0-valence. In order to have palladium and magnesium supported in a state where they are partly in contact, palladium may be supported directly on magnesium oxide, or magnesium oxide may be supported directly on palladium.

The catalyst active component may comprise another noble metal, in addition to palladium and magnesium. The noble metal may include platinum, rhodium and iridium, and preferably platinum and rhodium are cited. The noble metals may be used singly, or in a form of a mixture of two or more metals. Although the noble metal may be used as it is, it preferably is supported on a three-dimensional structure. When the catalyst active components are supported on a three-dimensional structure, the amount of supported platinum (in terms of platinum) is preferably not more than 10 g, and more preferably 0.21 to 5 g, based on 1 L of the three-dimensional structure, though it is not particularly limited thereto. Similarly, the amount of supported rhodium (in terms of rhodium oxide) is preferably not more than 5 g, and more preferably 0.02 to 1 g, based on 1 L of the three-dimensional structure, though it is not particularly limited thereto. If the amount of supported platinum exceeds 10 g, an efficiency of purifying exhaust gas would not increase for the amount, and the cost performance would occasionally decline due to the use of a larger amount of the expensive noble metal. If the amount of supported rhodium exceeds 5 g, an efficiency of purifying exhaust gas would not increase for the amount, and the cost performance would occasionally decline due to the use of a larger amount of the expensive noble metal.

Further, the catalyst active component may comprise cerium oxide and/or a ceria-zirconia composite oxide, in addition to palladium and magnesium, and optionally the aforementioned another noble metal. The cerium oxide and a ceria-zirconia composite oxide may be used singly or in a form of a mixture of two or more members. Although the cerium oxide and ceria-zirconia composite oxide may be used as they are, they preferably are supported on a three-dimensional structure. When the catalyst active components are supported on a three-dimensional structure, an amount of supported cerium oxide and/or a ceria-zirconia composite oxide is preferably not more than 250 g, and more preferably 10 to 150 g, based on 1 L of the three-dimensional structure, though it is not particularly limited thereto. If the supported amount is less than 10 g, effects of purifying an exhaust gas or effects of assisting the purification by cerium oxide and/or ceria-zirconia composite oxide would not be attained. On the other hand, if it exceeds 250 g, supporting or coating property on a three-dimensional structure, such as cordierite, would be insufficient. Further, the exhaust gas decreasing activity would not be able to be developed for the amount, and the cost performance would decline.

The cerium oxide and/or a ceria-zirconia composite oxide may comprise a rare-earth metal other than cerium. The rare-earth metal may be present either in a physically mixed form or in a form of a composite oxide with cerium. The rare-earth metal (other than cerium) may include lanthanum (La), neodymium (Nd), yttrium (Y), scandium (Sc), and praseodymium (Pr). Lanthanum, neodymium, yttrium, praseodymium, etc may be preferable. The rare-earth metal may be in a form of metal itself or in a form of an oxide. The amount of the used rare-earth metal (in terms of oxide) is 5 to 80 g, and preferably 10 to 50 g, based on 1 L of the three-dimensional structure, though it is not particularly limited thereto.

The catalyst active component may comprise an alkali metal and/or an alkaline earth metal, in addition to palladium and magnesium, and optionally the another noble metal, cerium oxide and a ceria-zirconia composite oxide. The alkali metal may include lithium, sodium, potassium, rubidium and cesium, and potassium is preferable. The alkaline earth metal may include calcium, strontium and barium, and barium is preferable. The alkali metal and/or the alkaline earth metal may be used singly or in a form of a mixture of two or more members. Although the alkali metal and/or the alkaline earth metal may be used as it is, it is preferably supported on a three-dimensional structure. When an alkali metal and/or an alkaline earth metal is supported on a three-dimensional structure, the amounts of alkali metal and/or an alkaline earth metal to be used (in terms of oxide) are, without particular restriction, preferably 0.5 to 40 g, based on 1 L of the three-dimensional structure.

The refractory inorganic oxide to be used in the present invention is not particularly limited, and those which have been generally used as a catalyst carrier can be used. The refractory inorganic oxide may include an activated alumina, such as $\alpha$-, $\gamma$-, $\delta$-, $\eta$-, and $\theta$-alumina, zeolite, titania, or zirconia, titania, silicon oxide, and a composite oxide thereof, such as alumina-titania, alumina-zirconia, and titania-zirconia. An activated alumina powder is preferable. The refractory inorganic oxide may be used singly or in a form of a mixture of two or more members. Although the refractory inorganic oxide may be used as it is, it is preferably be supported on a three-dimensional structure. When a refractory inorganic oxide is supported on a three-dimensional structure, the amount of refractory inorganic oxide to be used is usually, without particular restriction, 10 to 300 g, and preferably 30 to 150 g, based on 1 L of the three-dimensional structure. If it is less than 10 g, a noble metal would not be dispersed sufficiently leading to inadequate stability. If it is more than 300 g, the contact between noble metal and hydrocarbon introduced for temperature increase would become poor and the temperature increase would hardly occur.

The refractory inorganic oxide may comprise a rare-earth metal other than cerium. The rare-earth metal may be present either in a physically mixed form or in a form of a composite oxide with cerium. The rare-earth metal (other than cerium) may include lanthanum (La), neodymium (Nd), yttrium (Y), scandium (Sc), and praseodymium (Pr). Lanthanum, neodymium, yttrium, praseodymium, etc may be preferable. The rare-earth metal may be in a form of metal itself, in a form of an oxide, or in a form of a composite oxide with a refractory inorganic oxide. Although there is no particular restriction on an amount of the used rare-earth metal (other than cerium), the amount of the used rare-earth metal (other than cerium) (in terms of oxide) is 5 to 80 g, and preferably 10 to 50 g, based on 1 L of the three-dimensional structure.

The refractory inorganic oxide to be used in the present invention may be in any shape, such as in a granule shape, a particulate shape, a powder shape, a cylindrical shape, a conical shape, a prismatic shape, a cubic shape, a pyramidal shape, and an irregular shape. The refractory inorganic oxide is preferably in a granule shape, a particulate shape, or a powder shape, and more preferably in a powder shape. In the case where the refractory inorganic oxide is in a granule shape, a particulate shape, or a powder shape, the average particle size of the refractory inorganic oxide is, without particular restriction, preferably in the range of, for example, 0.5 to 150 μm, and more preferably 1 to 100 μm. Within such a range, it can be coated well on a three-dimensional structure. The term "average particle size" of the refractory inorganic oxide in the present invention can be determined as an average of particle sizes of the refractory inorganic oxide measured by means of a conventional method, such as classification.

There is no particular restriction on the BET specific surface area of the refractory inorganic oxide, but it is preferably 50 to 750 m$^2$/g, more preferably 150 to 750 m$^2$/g.

There is no particular restriction on a process for producing the catalyst of the present invention, and conventional processes can be applied. Preferably is applied a process which comprises mixing the catalyst active component in a form as they are, or in another appropriate form in an appropriate solvent to form a slurry, coating a three-dimensional structure with the slurry, and then drying and calcining the coated structure.

In the process, there is no particular restriction on a palladium (Pd) source as a starting material, and raw materials used in the field of purification of an exhaust gas can be used. Typically, palladium; halides such as palladium chloride; inorganic salts of palladium, such as nitrate, sulfate, acetate, ammonium salt, amine salt, tetramine salt, carbonate, bicarbonate, nitrite and oxalate; carboxylates such as formate; hydroxide, alkoxide, and oxide may be cited. Preferably, nitrate, acetate, ammonium salt, amine salt, tetramine salt and carbonate are used. Among them, nitrate (palladium nitrate), chloride (palladium chloride), acetate (palladium acetate), tetramine salt (tetramine palladium) are preferable, and palladium nitrate is more preferable. According to the present invention, the palladium source materials may be used singly or in combination of two or more members. The amount of the palladium source material to be incorporated is such an amount as to lead to the amount of palladium supported on a three-dimensional structure as described above.

Further, there is no particular restriction on a magnesium (Mg) source as a starting material, and raw materials used in the field of purification of an exhaust gas can be used. Typically, magnesium; oxides, such as magnesium oxide, magnesium peroxide, magnesium titanate, and magnesium chromate; halides such as magnesium chloride; magnesium salts, such as magnesium sulfate, magnesium hydroxide, magnesium carbonate, magnesium acetate, and magnesium nitrate may be cited. Among them, magnesium oxide, magnesium acetate, magnesium hydroxide, magnesium nitrate and magnesium sulfate are used preferably. According to the present invention, the magnesium source materials may be used singly or in combination of two or more members. The amount of the magnesium source material to be incorporated is such an amount as to lead to the amount of magnesium supported on a three-dimensional structure as described above.

In case where the catalyst active component comprises platinum, there is no particular restriction on a platinum (Pt) source as a starting material, and raw materials used in the field of purification of an exhaust gas can be used. Typically, platinum; halides, such as platinum bromide, and platinum chloride; inorganic salts of platinum, such as nitrate, dinitrodiamine salt, tetramine salt, sulfate, ammonium salt, amine salt, bis(ethanolamine) salt, bis(acetylacetonate) salt, carbonate, bicarbonate, nitrite and oxalate; carboxylates such as formate; hydroxide; alkoxide; and oxide may be cited. Among them, nitrate (platinum nitrate), dinitrodiamine salt (dinitroamine platinum), chloride (platinum chloride), tetramine salt (tetramine platinum), bis(ethanolamine) salt (bis(ethanolamine)platinum), and bis(acetylacetonate) salt (platinumbis(acetylacetonate)) are preferable. Nitrate and dinitrodiamine salt are more preferable. According to the present invention, the platinum source materials may be used singly or in a combination of two or more members. The amount of the platinum source material to be incorporated is such an amount as to lead to the amount of platinum supported on a three-dimensional structure as described above.

In case where the catalyst active component comprises rhodium, there is no particular restriction on a rhodium (Rh) source as a starting material, and raw materials used in the field of purification of an exhaust gas can be used. Typically, rhodium; halides such as rhodium chloride; inorganic salts of rhodium, such as nitrate, sulfate, acetate, ammonium salt, amine salt, hexamine salt, carbonate, bicarbonate, nitrite and oxalate; carboxylates such as formate; hydroxide; alkoxide; and oxide may be cited. Preferably, nitrate, ammonium salt, amine salt, and carbonate are used. Among them, nitrate (rhodium nitrate), chloride (rhodium chloride), acetate (rhodium acetate), hexamine salt (hexamine rhodium) are preferable, and rhodium nitrate is more preferable. The amount of the rhodium source material to be incorporated is such an amount as to lead to the amount of rhodium supported on a three-dimensional structure as described above.

In case where the catalyst of the present invention comprises a refractory inorganic oxide, cerium, a ceria-zirconia composite oxide, a rare-earth metal, an alkali metal, alkaline earth metal, these components as a starting material may be used in a form as it is, or in another form; and preferably used in a form as it is. The amount of each such component to be incorporated is such an amount as to lead to the amount of the component supported on a three-dimensional structure as described above, or to the amount of the component existing in the catalyst as described above.

In the process, the catalyst active components are mixed in an appropriate solvent to form a slurry. There is no particular restriction on an appropriate solvent to be used for forming a slurry. Any solvent which have been used for preparing a catalyst for purifying an exhaust gas can be used. An aqueous medium is preferable. The aqueous medium may include water; lower alcohols, such as cyclohexanol, ethanol and 2-propanol; and organic alkali aqueous solutions. Water and a lower alcohol are preferably used, and water is used especially preferably. There is no particular restriction on the concentration of the catalyst active component in the solvent, insofar as a desired amount can be supported on a three-dimensional structure. Preferably, after mixing the catalyst active component(s) in the solvent, the mixture is wet-milled. Wet-milling can be carried out generally according to a conventional method, and there is no particular restriction. For example, wet-milling can be carried out in a ball mill.

The catalyst of the present invention can be prepared by coating the slurry on a three-dimensional structure, followed by drying and calcining, so that the catalyst active components are supported on a three-dimensional structure.

There is no particular restriction on a three-dimensional structure that is covered by the catalyst active components, and similar materials as used generally for preparing a catalyst for purifying an exhaust gas can be used. A refractory three-dimensional structure is preferable. The refractory three-dimensional structure (a refractory monolithic three-dimensional structure) may include a heat-resistant support such as a honeycomb support. A monolithically-fabricated honeycomb support is preferable. Examples thereof may include a monolithic honeycomb support, a metal honeycomb support, a plug honeycomb support. Alternatively, a pellet support can be used, although it is not a monolithic three-dimensional structure.

As a monolithic support, usually a so-called ceramic honeycomb support is acceptable. A honeycomb support based on a material of cordierite, mullite, α-alumina, zirconia, titania, titanium phosphate, aluminium titanate, betalite, spondumene, aluminosilicate, or magnesium silicate, is preferable. Among others, a cordierite based support is especially preferable. Alternatively, a monolithic structure formed with an oxidation-resistant heat-resistant metal, such as stainless steel and Fe—Cr—Al alloy, can be used.

The monolithic support can be produced by an extrusion molding method, a method of winding tightly a sheet-formed element, or the like. The shape of an opening for gas entry (cell form) may has any of hexagonal, rectangular, triangular or corrugation shape. In view of usability, a cell density (cell number/unit cross-sectional area) of 100 to 1200 cells/in$^2$ is satisfactory, and 200 to 900 cells/in$^2$ is preferable.

There is no particular restriction on drying and calcining conditions after coating on a three-dimensional structure, and similar conditions applied to preparation of a catalyst for purifying an exhaust gas are applicable. For example, after contacting (coating) a slurry with a three-dimensional structure support, the three-dimensional structure may be pulled out of the slurry to remove excess slurry. Then the structure support may be dried in air at 50 to 300° C., preferably 80 to 200° C., for 5 min to 10 hours, preferably 5 min to 8 hours. Subsequently, the structure support may be calcined at a temperature of 300 to 1200° C., preferably 400 to 500° C., for 30 min to 10 hours, preferably 1 hour to 5 hours.

According to the process, the catalyst of the present invention is produced by mixing desired catalyst active components to prepare a slurry, coating the slurry on a three-dimensional structure, and drying and calcining the structure. Alternatively, the catalyst of the present invention can be produced by preparing two or more slurries of catalyst active component(s), sequentially coating each the slurry on a three-dimensional structure, and drying and calcining the structure. Specifically, one of the slurries of the catalyst active component(s) may be contacted with a three-dimensional structure, and then dried in air at 50 to 300° C., preferably 80 to 200° C., for 5 min to 10 hours, preferably 5 min to 8 hours, and then calcined at 300 to 1200° C., preferably 400 to 500° C., for 30 min to 10 hours, preferably 1 hour to 5 hours. Then, another slurry of the catalyst active component(s) may be similarly supported on the three-dimensional structure, and optionally, the third slurry may be supported similarly, to yield a complete catalyst.

The catalyst of the present invention as described above, or the catalyst to be produced by the process as described above, comprises palladium supported in an oxidation state where 2-valence and/or 4-valence is dominant over 0-valence. Accordingly, it can exhibit high combustion activity on hydrocarbon in an exhaust gas from an internal combustion engine in acceleration period with an A/F value less than a theoretical air-fuel ratio (14.7). Consequently, the catalyst of the present invention can be advantageously used for treating an exhaust gas containing a reducing gas from an internal combustion engine. Particularly, it can exhibit excellent effects in removing hydrocarbon(s) contained in a highly reductive exhaust gas from an internal combustion engine, especially a gasoline engine, for example, during acceleration period. The catalyst of the present invention can be used advantageously for treating an exhaust gas from an internal combustion engine with an A/F value less than 14.7.

Accordingly, the present invention is to also provide a process for purifying an exhaust gas which comprises treating hydrocarbon in the exhaust gas from an internal combustion engine including a reducing gas using the catalyst of the present invention. The process may comprise a step for contacting the catalyst of the present invention with an exhaust gas from an internal combustion engine including a reducing gas.

When the catalyst of the present invention is used for purifying an exhaust gas from an internal combustion engine, especially a gasoline engine, a space velocity (S.V.) is 10,000 to 120,000 h$^{-1}$, and preferably 30,000 to 100,000 h$^{-1}$. If the A/F value in an exhaust gas is less than 14.7, the catalyst is sufficiently active, and if the A/F value decreases to 13.3 or less, it would have still purifying activity. An acceleration in acceleration period is preferably less than 10 km/s$^2$, more preferably less than 5 km/s$^2$, and further preferably 1 to 5 km/s$^2$. A speed in acceleration period is preferably less than 300 km/h, more preferably less than 200 km/h, and further preferably 50 to 150 km/h.

The temperature at a catalyst inlet in acceleration period is preferably 200° C. to 1200° C., and more preferably 200° C. to 800° C. Hydrocarbon(s) emitted from an internal combustion engine may vary depending on a used fuel. The fuel is preferably a fuel applicable to an MPI engine, and is preferably gasoline, E10, E30, E85, E100, or CNG. Even for a light oil, dimethyl ether or a biodiesel oil, the catalyst of the present invention can be effectively used, so long as an A/F value is less than 14.7.

A similar or different catalyst for purifying an exhaust gas may be disposed upstream of or downstream of the catalyst of the present invention.

EXAMPLES

The present invention will now be described in more detail by way of Examples and Comparative Examples, provided that the present invention should not be considered to be limited to the following Examples.

[Measurement of Surface Palladium Valence]

Example 1

Using palladium nitrate as a source material for palladium and magnesium oxide as a source material for magnesium, respectively, an aqueous mixed solution of palladium (in terms of palladium), magnesium (in terms of magnesium oxide) and alumina in a weight ratio of palladium:magnesium oxide:alumina=1.25:50:30 was prepared, and wet-milled in a ball mill, to yield a slurry. Then, the slurry was coated on a cordierite with a diameter of 24 mm, a length of 47 mm, and a volume of 0.021 L, dried at 200° C. for 5 min, and calcined at 500° C. for 1 hour in air, to yield a catalyst A having 81.25 g of catalyst active components supported per 1 L of cordierite. As reduced to palladium oxide (PdO), the composition of the catalyst A is as follows: palladium oxide (PdO):magnesium oxide (MgO):alumina=1.44:50:30 (weight ratio).

The catalyst A was tested for the proportion of palladium having each surface charge by X-ray photoelectron spectroscopy (XPS). The results are shown in Table 1.

Comparative Example 1

Using palladium nitrate as a source material for palladium, an aqueous mixed solution of palladium (in terms of palladium) and alumina in a weight ratio of palladium:alumina=1.25:80 was prepared, and wet-milled in a ball mill, to yield a slurry. Then, the slurry was coated on a cordierite with a diameter of 24 mm, a length of 47 mm, and a volume of 0.021 L, dried at 200° C. for 5 min, and calcined at 500° C. for 1 hour in air, to yield a catalyst B having 81.25 g of catalyst active component supported per 1 L of cordierite. As reduced to palladium oxide (PdO), the composition of the catalyst B is as follows: palladium oxide (PdO):alumina=1.44:80 (weight ratio).

The catalyst B was tested for the proportion of palladium having each surface charge by a similar method as in Example 1. The results are shown in Table 1.

catalyst inlet of 260° C. When the temperature of the catalyst inlet was stabilized at 260° C., 880 vol-ppm of $C_3H_8$ (in terms of methane) and 3520 vol-ppm of $C_3H_6$ (in terms of methane) were supplied to the catalyst A. After 10 min from the start of gas supply, the concentration of hydrocarbon (in terms of methane) emitted from the catalyst outlet was measured to calculate a total hydrocarbon purification ratio (hereinafter referred to as "THC purification ratio"). The results are shown in Table 2. The THC purification ratio is calculated by the following formula.

$$THC \text{ purification ratio } (\%) = \frac{(THC \text{ concentration supplied to catalyst}) - (THC \text{ concentration emitted from catalyst outlet})}{(THC \text{ concentration supplied to catalyst})} \times 100 \quad \text{[Formula 1]}$$

TABLE 1

|  | Amount of supported PdO (g/L) [Amount of supported Pd (g/L)] | Amount of supported MgO (g/L) | Amount of supported alumina (g/L) | 0-valence | 2-valence | 4-valence |
|---|---|---|---|---|---|---|
| Example 1 | 1.44 [1.25] | 50 | 30 | 0.385 | 0.525 | 0.09 |
| Comparative Example 1 | 1.44 [1.25] | 0 | 80 | 0.548 | 0.152 | 0.30 |

It is noted from Table 1 that a higher proportion of palladium in an oxidation state of 2-valence or 4-valence was supported than that of 0-valence in the catalyst A of the present invention. On the other hand, in the catalyst B of Comparative Example 1, a higher proportion of 0-valent palladium was supported than 2-valent or 4-valent palladium.

[Reactivity Under Conditions of Low A/F and High S.V.]

Example 2

The catalyst A prepared in Example 1 was calcined at 950° C. for 50 hours in air and filled in a reaction tube. A simulation gas consisted of 200 ppm of NO, 4.7% of CO, 2% of $O_2$, 880 vol-ppm of $C_3H_8$ (in terms of methane), 3520 vol-ppm of $C_3H_6$ (in terms of methane), 6% by volume of $CO_2$, 7% by volume of $H_2O$, and the balance of nitrogen was supplied thereto at a space velocity (S.V.) of 94,000 $h^{-1}$. An A/F value was 13.3. The A/F value was calculated according to the formula described in SAE PAPER 650507. Then, only $C_3H_8$ and $C_3H_6$ were excluded from the simulation gas, and the rest of the gas was supplied to the catalyst A. Thereafter, the reaction tube was heated so as to give the temperature at the Comparative Example 2

By the same procedure as in Example 2 except that the catalyst B prepared in Comparative Example 1 was used instead, the catalyst B was calcined at 950° C. for 50 hours in air, and then the reaction using the catalyst was conducted with the simulation gas. The results are shown in Table 2.

TABLE 2

|  | Catalyst | Amount of Supported PdO (g/L) [Amount of Supported Pd (g/L)] | Amount of Supported MgO (g/L) | Reaction temperature (° C.) | THC purification ratio (%) |
|---|---|---|---|---|---|
| Example 2 | A | 1.44 [1.25] | 50 | 260 | 95.9 |
| Comparative Example 2 | B | 1.44 [1.25] | 0 | 260 | 1.2 |

Example 3

Using palladium nitrate as a source material for palladium and magnesium hydroxide as a source material for magnesium, an aqueous mixed solution of palladium (in terms of palladium oxide (PdO)), magnesium (in terms of magnesium oxide (MgO)) and alumina in a weight ratio of palladium oxide:magnesium oxide:alumina=5.06:20:80 was prepared, and wet-milled in a ball mill, to yield a slurry. As reduced to palladium oxide (Pd), the composition of the catalyst A is as follows: palladium (Pd):magnesium oxide (MgO):alumina=4.4:20:80 (weight ratio). Then, the slurry was coated on a cordierite with a diameter of 24 mm, a length of 47 mm, and a volume of 0.021 L, dried at 200° C. for 5 min, and calcined at 500° C. for 1 hour in air, to yield a catalyst C having 105.06 g of catalyst active components supported per 1 L of cordierite. The catalyst C was tested for the proportion of palladium having each surface charge by a similar method as in Example 1, to find that a higher proportion of palladium in an oxidation state of 2-valence or 4-valence was supported than that of 0-valence in the catalyst C of the present invention.

The catalyst C was tested for THC purification ratio (total hydrocarbon purification ratio) by a similar process as in Example 2. Specifically, the catalyst C was calcined at 950° C. for 50 hours in air and filled in a reaction tube. A simulation gas consisted of 200 ppm of NO, 4.7% by volume of CO, 2% by volume of $O_2$, 880 vol-ppm of $C_3H_8$ (in terms of methane), 3520 vol-ppm of $C_3H_6$ (in terms of methane), 6% by volume of $CO_2$, 7% by volume of $H_2O$, and the balance of nitrogen was supplied thereto at a space velocity (S.V.) of 94,000 $h^{-1}$. Then, only $C_3H_8$ and $C_3H_6$ were excluded from the simulation gas, and the rest of the gas was supplied to the catalyst C. Thereafter, the reaction tube was heated so as to give the temperature at the catalyst inlet of 240° C. When the temperature of the catalyst inlet was stabilized at 240° C., 880 vol-ppm of $C_3H_8$ (in terms of methane) and 3520 vol-ppm of $C_3H_6$ (in terms of methane) were supplied to the catalyst C. After 10 min from the start of gas supply, the concentration of hydrocarbon (in terms of methane) emitted from the catalyst outlet was measured to calculate a THC purification ratio (total hydrocarbon purification ratio). The results are shown in Table 3.

Example 4

The same procedure as in Example 3 was repeated except that weight ratio of palladium oxide:magnesium oxide:alumina was changed to 5.06:10:80, to prepare a catalyst D having 95.06 g of catalyst active components supported per 1 L of cordierite. The THC purification ratio thereof was tested by the same method as in Example 3, to obtain the results shown in Table 3.

The catalyst D was tested for the proportion of palladium having each surface charge by a similar method as in Example 1, to find that a higher proportion of palladium in an oxidation state of 2-valence or 4-valence was supported than that of 0-valence in the catalyst D of the present invention.

Example 5

The same procedure as in Example 3 was repeated except that weight ratio of palladium oxide:magnesium oxide:alumina was changed to 5.06:5:80, to prepare a catalyst E having 90.06 g of catalyst active components supported per 1 L of cordierite. The THC purification ratio thereof was tested by the same method as in Example 3, to obtain the results shown in Table 3.

The catalyst E was tested for the proportion of palladium having each surface charge by a similar method as in Example 1, to find that a higher proportion of palladium in an oxidation state of 2-valence or 4-valence was supported than that of 0-valence in the catalyst E of the present invention.

Comparative Example 3

The same procedure as in Example 3 was repeated except that weight ratio of palladium oxide:alumina was changed to 5.06:80, to prepare a catalyst F having 85.06 g of catalyst active component supported per 1 L of cordierite. The THC purification ratio thereof was tested by the same method as in Example 3, to obtain the results shown in Table 3.

The catalyst F was tested for the proportion of palladium having each surface charge by a similar method as in Example 1, to find that a higher proportion of 0-valent palladium was supported than 2-valent or 4-valent palladium in the catalyst F of Comparative Example 3.

Example 6

THC purification ratio (total hydrocarbon purification ratio) was tested by the same procedure as in Example 3 except that 880 vol-ppm of $C_3H_8$ (in terms of methane) and 3520 vol-ppm of $C_3H_6$ (in terms of methane) were supplied to the catalyst C, when the temperature of the catalyst inlet was stabilized at 230° C. The results are shown in Table 3.

Example 7

THC purification ratio (total hydrocarbon purification ratio) was tested by the same procedure as in Example 4 except that 880 vol-ppm of $C_3H_8$ (in terms of methane) and 3520 vol-ppm of $C_3H_6$ (in terms of methane) were supplied to the catalyst D, when the temperature of the catalyst inlet was stabilized at 230° C. The results are shown in Table 3.

Comparative Example 4

THC purification ratio (total hydrocarbon purification ratio) was tested by the same procedure as in Comparative Example 3 except that 880 vol-ppm of $C_3H_8$ (in terms of methane) and 3520 vol-ppm of $C_3H_6$ (in terms of methane) were supplied to the catalyst F, when the temperature of the catalyst inlet was stabilized at 230° C. The results are shown in Table 3.

TABLE 3

| | Catalyst | Amount of Supported PdO (g/L) [Amount of Supported Pd (g/L)] | Amount of Supported MgO (g/L) | Reaction temperature (° C.) | THC purification ratio (%) |
|---|---|---|---|---|---|
| Example 3 | C | 5.06 [4.4] | 20 | 240 | 86.3 |
| Example 4 | D | 5.06 [4.4] | 10 | 240 | 97.4 |
| Example 5 | E | 5.06 [4.4] | 5 | 240 | 51.2 |
| Comparative Example 3 | F | 5.06 [4.4] | 0 | 240 | 11.4 |

TABLE 3-continued

| | Catalyst | Amount of Supported PdO (g/L) [Amount of Supported Pd (g/L)] | Amount of Supported MgO (g/L) | Reaction temperature (° C.) | THC purification ratio (%) |
|---|---|---|---|---|---|
| Example 6 | C | 5.06 [4.4] | 20 | 230 | 78.8 |
| Example 7 | D | 5.06 [4.4] | 10 | 230 | 30.7 |
| Comparative Example 4 | F | 5.06 [4.4] | 0 | 230 | 4.2 |

It is noted from the results in Table 3 that the catalysts C, D and E of the present invention are superior in removing hydrocarbon(s) in a fuel-rich highly reducing gas atmosphere with an A/F value as low as 13.3, even when the amounts of palladium and magnesium oxide are varied.

[Combustion Activity of Hydrocarbon(s) Emitted During Acceleration Period of Automobile]

Example 8

Using palladium nitrate as a source material for palladium, magnesium oxide as a source material for magnesium, rhodium nitrate as a source material for rhodium, dinitrodiamine platinum as a source material for platinum, lanthanum-alumina ($La_2O_3$:alumina=3:97), and a ceria-zirconia composite oxide ($CeO_2$:$ZrO_2$=72:21), an aqueous mixed solution of palladium (in terms of palladium oxide (PdO)), magnesium (in terms of magnesium oxide (MgO)), and rhodium (in terms of rhodium oxide ($Rh_2O_3$)) in a weight ratio of palladium oxide:magnesium oxide:rhodium oxide:platinum:lanthanum-alumina:ceria-zirconia composite oxide=0.58:20:0.25:0.2:140:90 was prepared, and wet-milled to yield a slurry G. As reduced to palladium (Pd), the composition of the aqueous solution is as follows: palladium (Pd):magnesium oxide rhodium oxide:platinum:lanthanum-alumina:ceria-zirconia composite oxide=0.50:20:0.25:0.2:140:90 (weight ratio). Then the slurry G was coated on a cordierite with a diameter of 110 mm, a length of 97 mm, and a volume of 0.92 L, dried at 200° C. for 10 min, and calcined at 500° C. for 1 hour in air, to yield a catalyst G having 251.03 g of catalyst active components supported per 1 L of cordierite. The catalyst G was tested for the proportion of palladium having each surface charge by a similar method as in Example 1, to find that a higher proportion of palladium in an oxidation state of 2-valence or 4-valence was supported than that of 0-valence in the catalyst G of the present invention.

Figure 2:
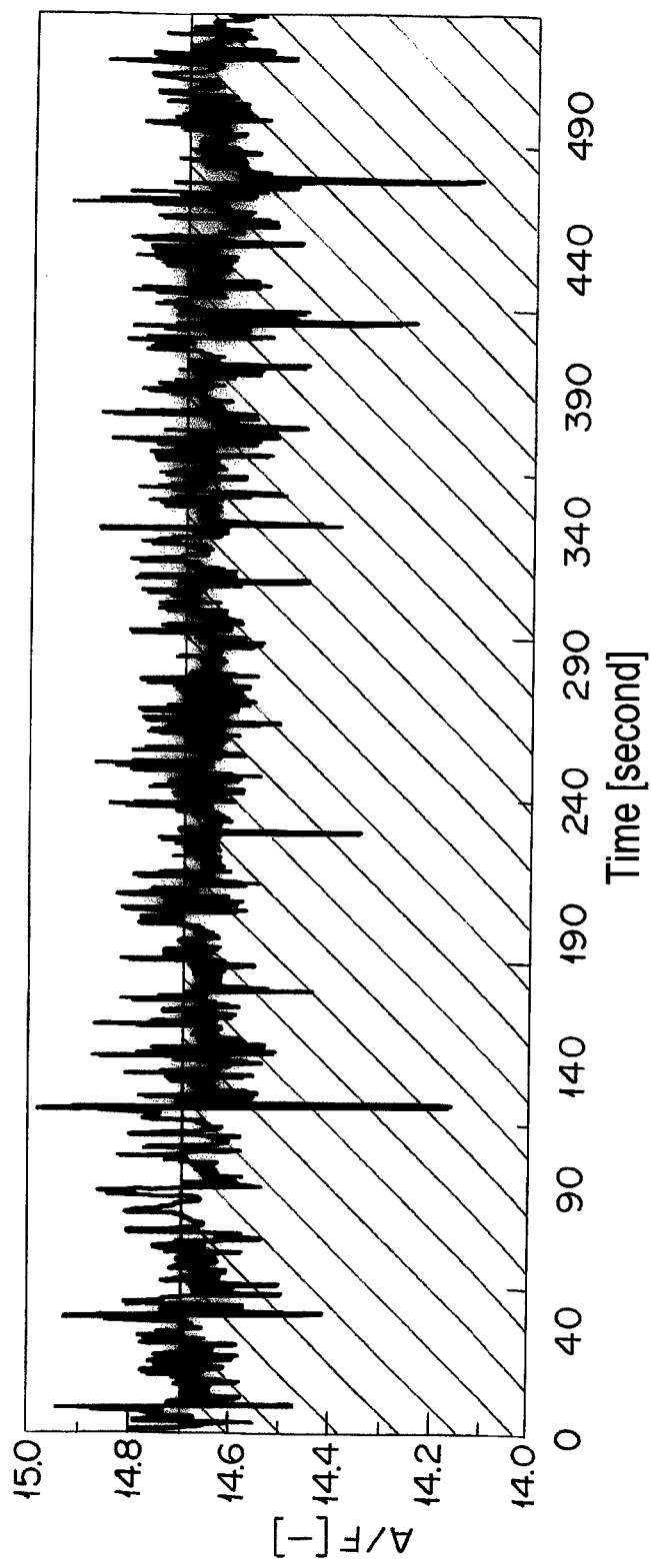
FIG. 2 is a graph showing an A/F value.
Figure 3:
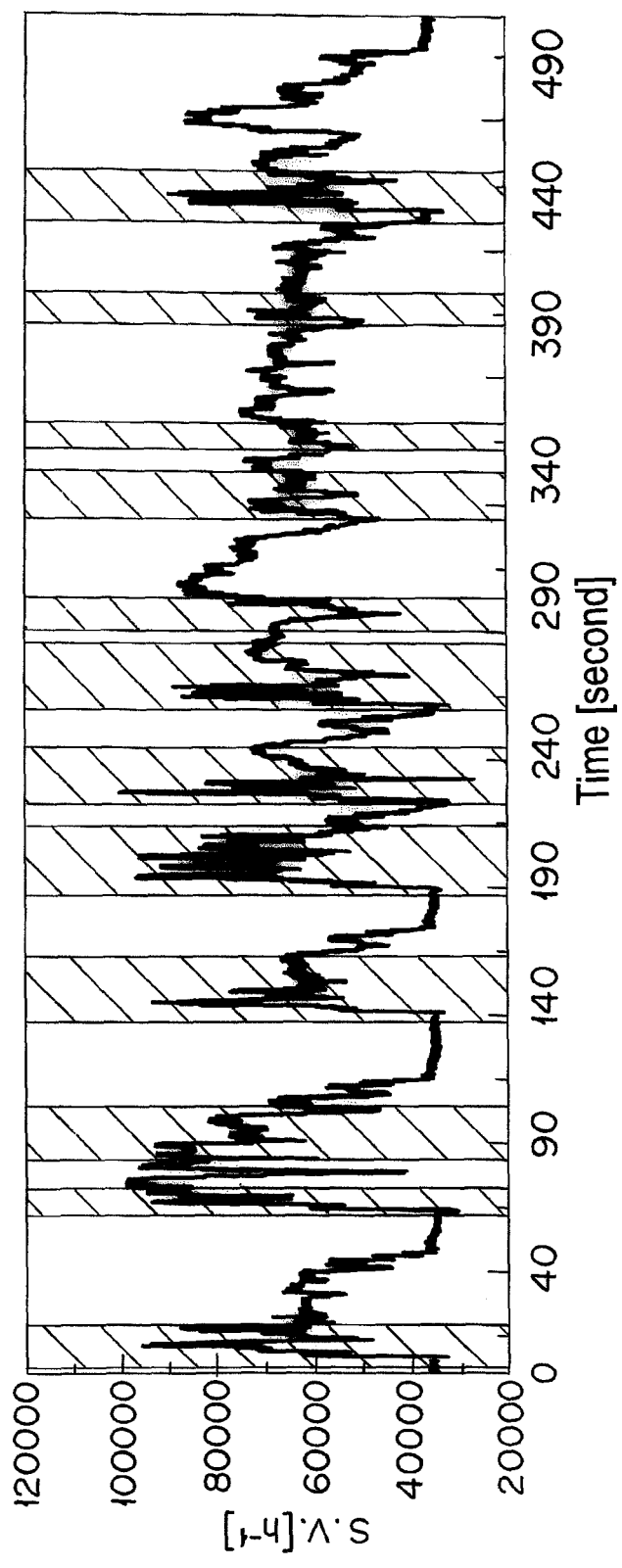
FIG. 3 is a graph showing S.V.
Figure 4:
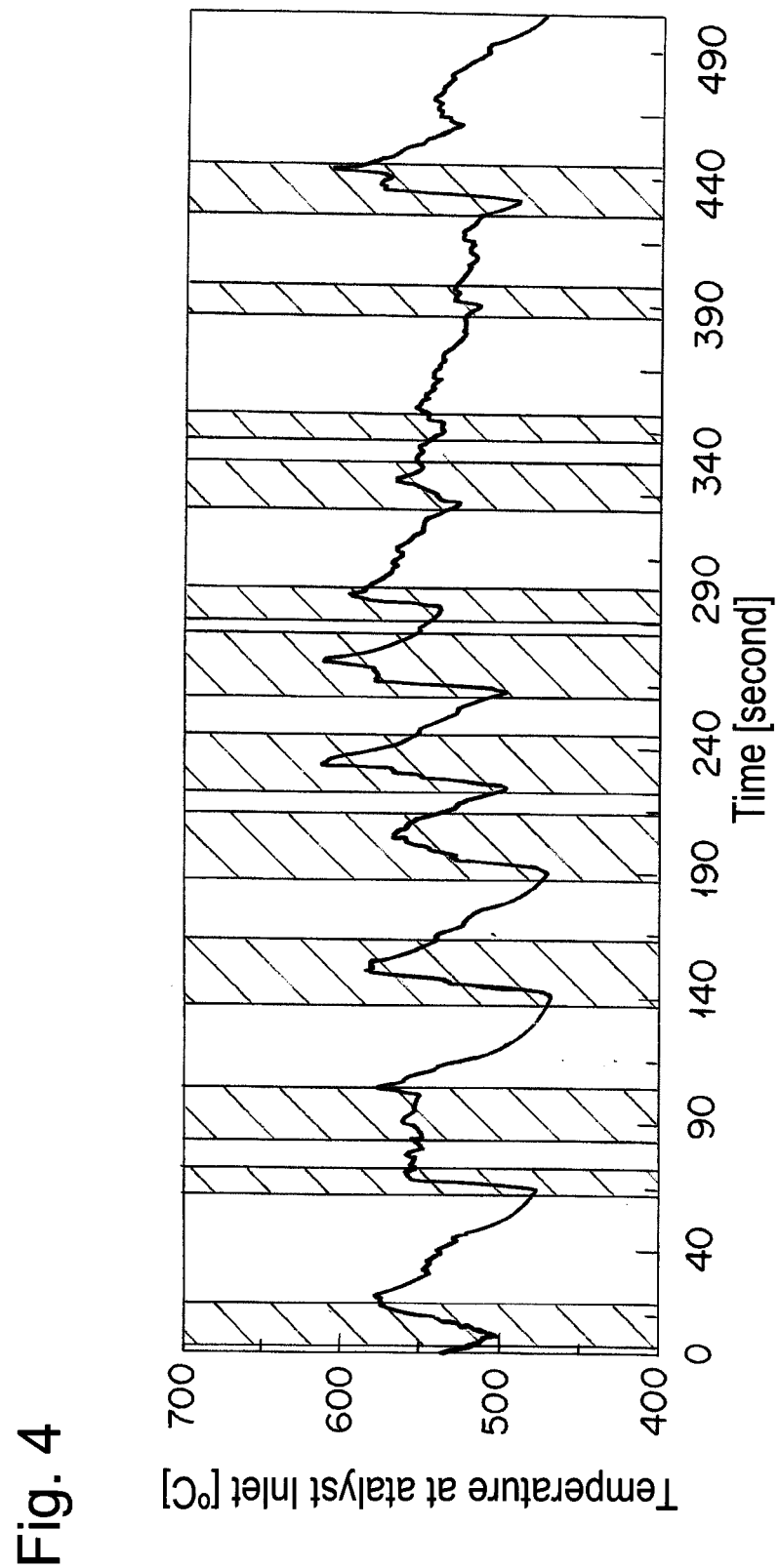
FIG. 4 is a graph showing a temperature at a catalyst inlet.

Then, the catalyst G was installed 30 cm downstream of an engine in a vehicle having 2.5-L displacement, 4-cylinder MPI engine. An exhaust gas of the engine was passed therethrough at 1000° C. for 50 hours. The vehicle was driven on a chassis dynamometer at a running speed shown in FIG. 1, and an emission gas was sampled from the outlet of the catalyst G. An A/F value is shown in FIG. 2, a space velocity is shown in FIG. 3, and a temperature at the catalyst inlet is shown in FIG. 4, respectively. An amount of total hydrocarbons (THC) emitted from the catalyst outlet when driven under the above running conditions is shown by a solid line in FIG. 5. In repeating steps of acceleration and deceleration at the running speed, the maximum acceleration was 4.6 km/s².

Comparative Example 5

Using palladium nitrate as a source material for palladium, rhodium nitrate as a source material for rhodium, dinitrodiamine platinum as a source material for platinum, lanthanum-alumina ($La_2O_3$:alumina=3:97), and a ceria-zirconia composite oxide ($CeO_2$:$ZrO_2$=72:21), an aqueous mixed solution of palladium (in terms of palladium oxide (PdO)), and rhodium (in terms of rhodium oxide ($Rh_2O_3$)) in a weight ratio of palladium oxide:rhodium oxide:platinum:lanthanum-alumina:ceria-zirconia composite oxide=0.58:0.25:0.2:160:90 was prepared, and wet-milled to yield a slurry H. As reduced to palladium (Pd), the composition of the aqueous solution is as follows: palladium (Pd):rhodium oxide:platinum:lanthanum-alumina:ceria-zirconia composite oxide=0.50:0.25:0.2:160:90 (weight ratio). Then the slurry H was coated on a cordierite with a diameter of 110 mm, a length of 97 mm, and a volume of 0.92 L, dried at 200° C. for 10 min, and calcined at 500° C. for 1 hour in air, to yield a catalyst H having 251.03 g of catalyst active components supported per 1 L of cordierite. The catalyst H was tested for the proportion of palladium having each surface charge by a similar method as in Example 1, to find that a higher proportion of 0-valent palladium was supported than 2-valent or 4-valent palladium in the catalyst H of Comparative Example 5.

Then, the catalyst H was installed 30 cm downstream of an engine in a vehicle having 2.5-L displacement, 4-cylinder MPI engine. An exhaust gas of the engine was passed therethrough at 1000° C. for 50 hours. Then, the hydrocarbon emission characteristics were examined similarly as in Example 8. The result is shown by a broken line in FIG. 5.

Figure 5:
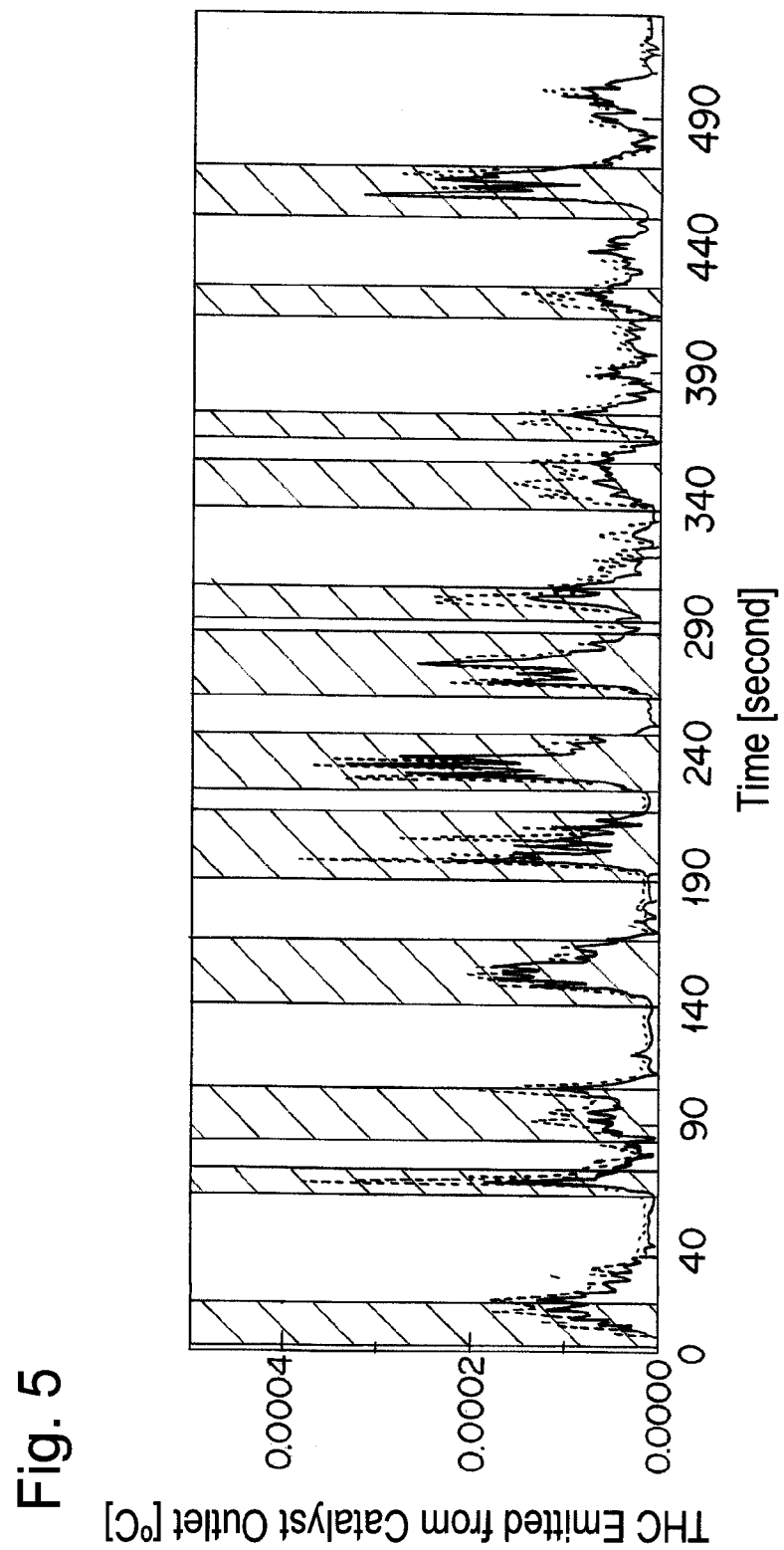
FIG. 5 is a graph showing THC amount emitted from a catalyst outlet.

It is noted from FIG. 5 that by exercising the present invention (solid line), the emission of hydrocarbon(s) especially in acceleration period was at a low level even in an actual car.

Example 9

Using palladium nitrate as a source material for palladium, magnesium hydroxide as a source material for magnesium, lanthanum-alumina ($La_2O_3$:alumina=3:97), and a ceria-zirconia composite oxide ($CeO_2$:$ZrO_2$=72:21), an aqueous mixed solution of palladium (in terms of palladium oxide (PdO)) and magnesium (in terms of magnesium oxide (MgO)) in a weight ratio of palladium oxide:magnesium oxide:lanthanum-alumina:ceria-zirconia composite oxide=3.45:20:65:30 was prepared, and wet-milled to yield a slurry I1. As reduced to palladium (Pd), the composition of the aqueous solution is as follows: palladium (Pd):magnesium oxide:lanthanum-alumina:ceria-zirconia composite oxide=3:20:65:30. Then the slurry I1 was coated on a cordierite with a diameter of 110 mm, a length of 97 mm, and a volume of 0.92 L, dried at 200° C. for 10 min, and calcined at 500° C. for 1 hour in air, to support 118.45 g of catalyst active components per 1 L of cordierite.

Using dinitrodiamine platinum as a source material for platinum, rhodium nitrate as a source material for rhodium, lanthanum-alumina ($La_2O_3$:alumina=3:97), and a ceria-zirconia composite oxide ($CeO_2$:$ZrO_2$=72:21), an aqueous mixed solution of platinum (in terms of platinum) and rhodium (in terms of rhodium oxide ($Rh_2O_3$)) in a weight ratio of Pt:$Rh_2O_3$:lanthanum-alumina:ceria-zirconia composite oxide=0.2:0.25:50:20 was prepared, and wet-milled to yield a slurry containing catalyst components G2. Then the slurry G1 was coated on the cordierite to coat a slurry I2 on the catalyst which had been dried and calcined as above, dried at 200° C. for 10 min, and calcined at 500° C. for 1 hour in air, to yield a catalyst I having 70.45 g of catalyst active components supported per 1 L of cordierite. The catalyst I was tested for the proportion of palladium having each surface charge by a similar method as in Example 1, to find that a higher proportion of palladium in an oxidation state of 2-valence or 4-valence was supported than that of 0-valence in the catalyst I of the present invention.

Example 10

The same procedure as in Example 9 was repeated except that a slurry J1 containing palladium oxide, magnesium oxide, lanthanum-alumina, and ceria-zirconia composite oxide in a weight ratio of 3.45:10:75:30 was used instead, to prepare a catalyst J having 118.45 g of catalyst active components supported per 1 L of cordierite. The catalyst J was tested for the proportion of palladium having each surface charge by a similar method as in Example 1, to find that a higher proportion of palladium in an oxidation state of 2-valence or 4-valence was supported than that of 0-valence in the catalyst J of the present invention.

Example 11

The same procedure as in Example 9 was repeated except that a slurry K1 containing palladium oxide, magnesium oxide, lanthanum-alumina, and ceria-zirconia composite oxide in a weight ratio of 3.45:5:80:30 was used instead, to prepare a catalyst K having 118.45 g of catalyst active components supported per 1 L of cordierite. The catalyst K was tested for the proportion of palladium having each surface charge by a similar method as in Example 1, to find that a higher proportion of palladium in an oxidation state of 2-valence or 4-valence was supported than that of 0-valence in the catalyst K of the present invention.

Comparative Example 6

The same procedure as in Example 9 was repeated except that a slurry L1 containing palladium oxide, lanthanum-alumina, and ceria-zirconia composite oxide in a weight ratio of 3.45:85:30 was used instead, to prepare a catalyst L having 118.45 g of catalyst active components supported per 1 L of cordierite. The catalyst L was tested for the proportion of palladium having each surface charge by a similar method as in Example 1, to find that a higher proportion of 0-valent palladium was supported than 2-valent or 4-valent palladium in the catalyst L of Comparative Example 6.

Figure 6:
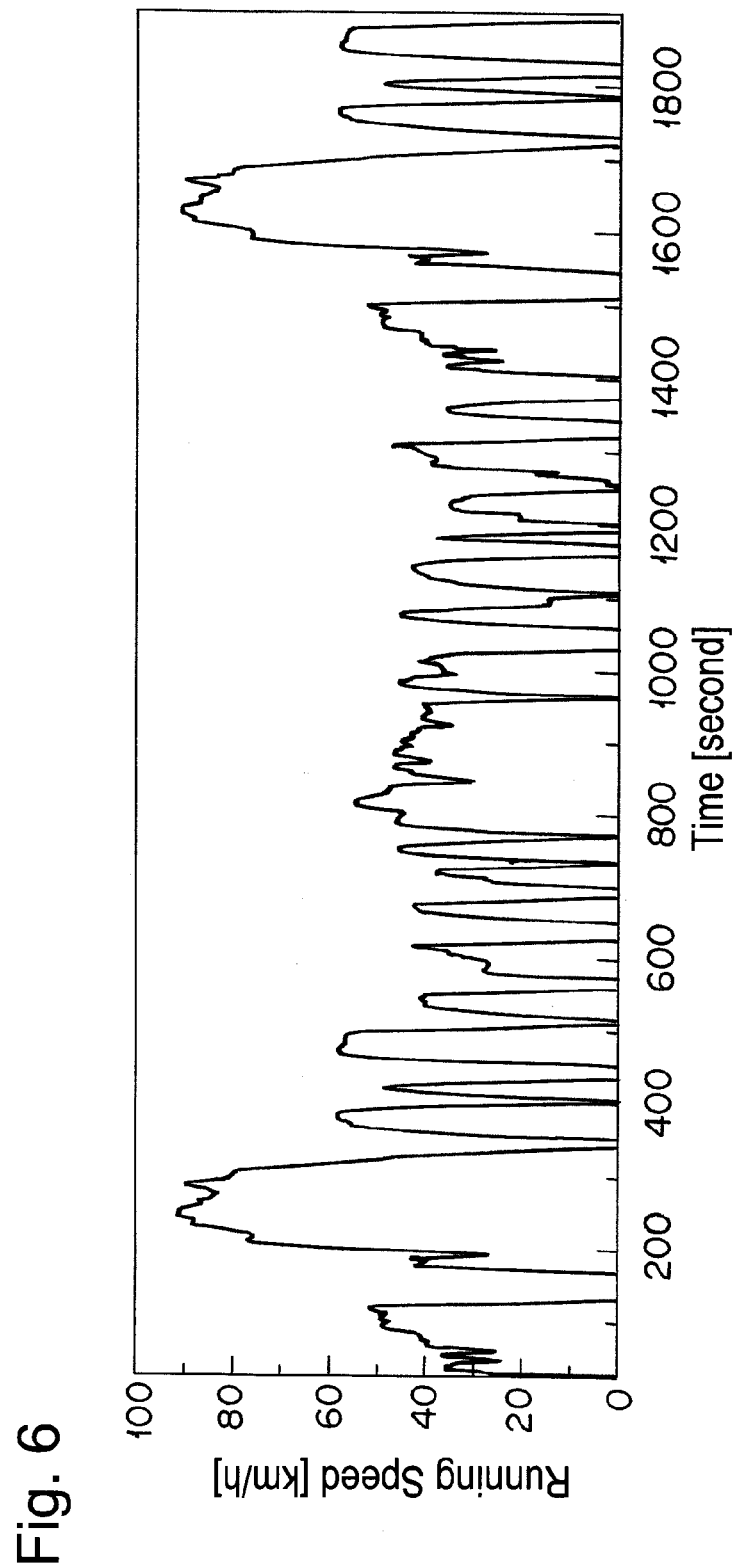
FIG. 6 is a graph showing a running speed.
Figure 7:
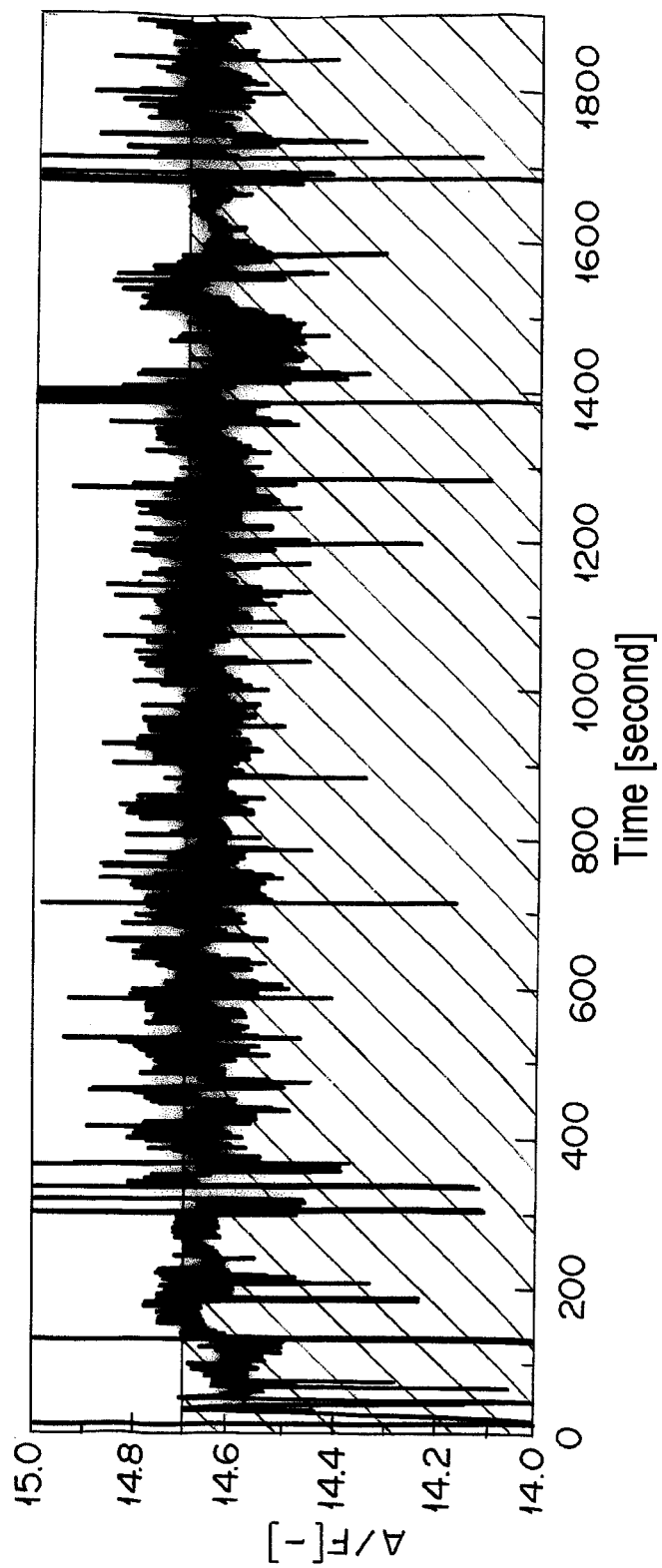
FIG. 7 is a graph showing an A/F value.
Figure 8:
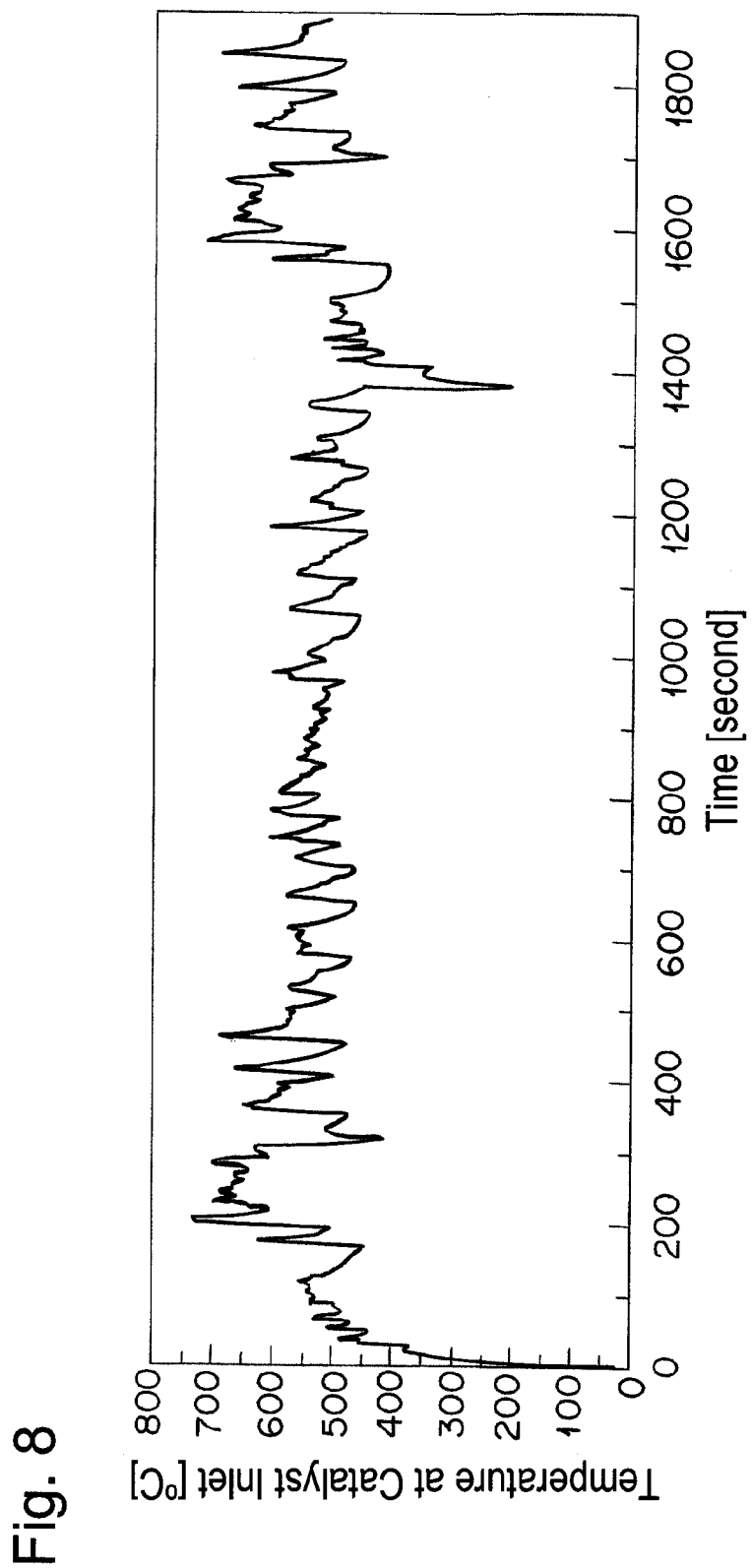
FIG. 8 is a graph showing a temperature at a catalyst inlet.
Figure 9:
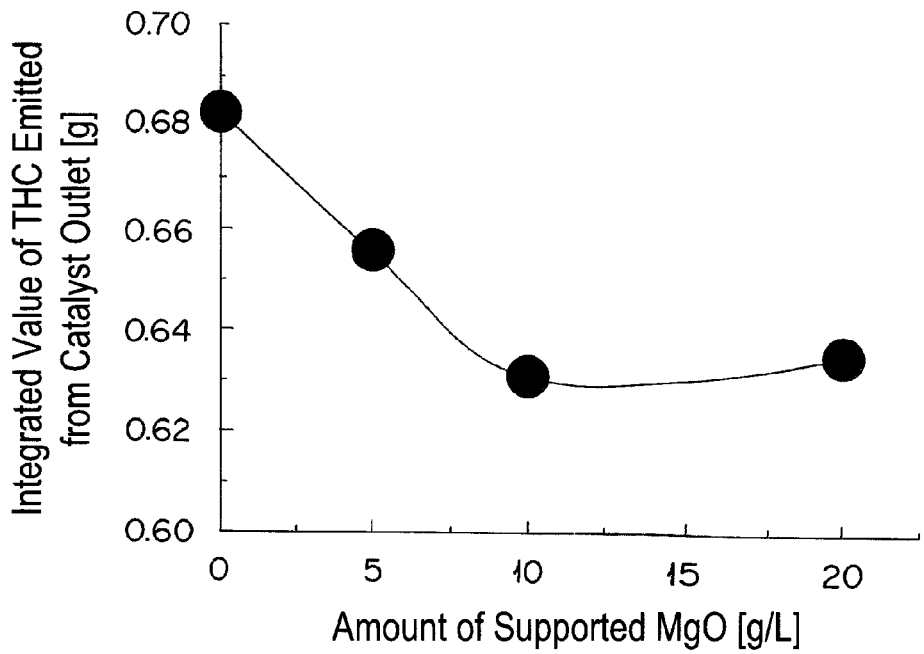
FIG. 9 is a graph showing integrated value of total hydrocarbon (THC) amount emitted from a catalyst outlet.

Then, the catalysts I, J, K, L was separately installed 130 cm downstream of an engine in a vehicle having 2.5-L displacement, 4-cylinder MPI engine. An exhaust gas of the engine was passed therethrough at 1000° C. for 50 hours. The vehicle was driven while acceleration and deceleration steps were repeated with a running speed (LA-4 cycle) shown in FIG. 6, an emission gas was sampled from the outlet of each the catalyst. The amounts of emitted hydrocarbon(s) were integrated until the end of the run. An A/F is shown in FIG. 7, the temperature at the catalyst inlet is shown in FIG. 8, and an integrated value of the total hydrocarbon (THC) amounts emitted from the catalysts outlet is shown in FIG. 9, respectively. In repeating steps of acceleration and deceleration at the running speed, the maximum acceleration was 5.0 km/s$^2$.

As shown in FIG. 9, the integrated values of the THC emission were small even if an amount of supported MgO is varied between 5 and 20 g, demonstrating that the catalysts have excellent activity of purifying hydrocarbon.

[Comparison of THC Emissions Before and After Reduction]

Example 12

The catalyst I which had been tested by the LA-4 cycle was treated at A/F=13.8, at 800° C. for 1 hour. Then the vehicle was driven at a similar running speed, to determine an integrated value of total hydrocarbon (THC) emission from the catalyst outlet. The results are shown in FIG. 10.

Comparative Example 7

The catalyst L which had been tested by the LA-4 cycle was treated at A/F=13.8, at 800° C. for 1 hour. Then the vehicle was driven at a similar running speed, to determine an integrated value of total hydrocarbon (THC) emission from the catalyst outlet. The results are shown in FIG. 10.

Figure 10:
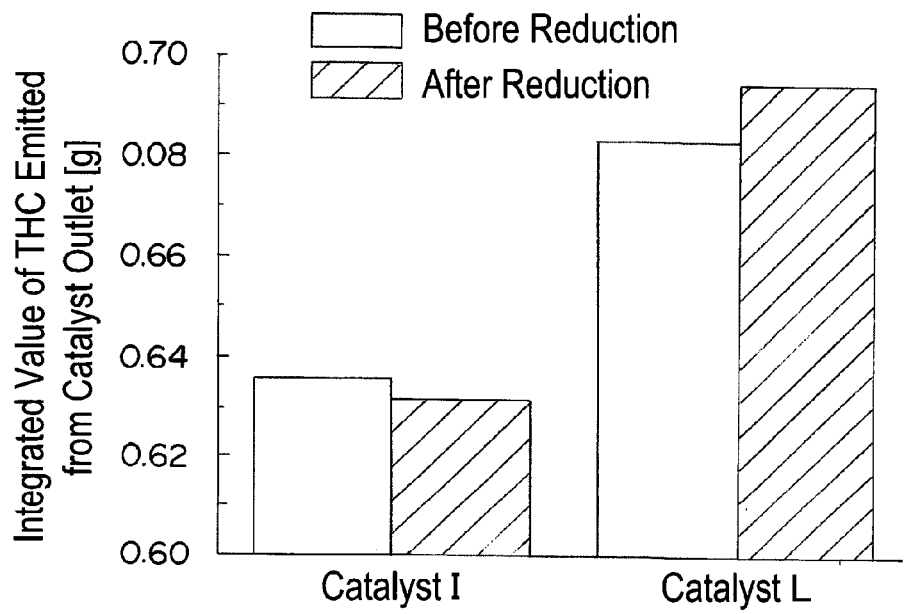
FIG. 10 is a graph showing integrated value of total hydrocarbon (THC) amount emitted from a catalyst outlet in Example 12 and Comparative Example 7.

As shown in FIG. 10, the catalyst I having a higher proportion of palladium in an oxidation state of 2-valence or 4-valence supported than that of 0-valence showed no increase in hydrocarbon emission even after reduction, while the catalyst L having no MgO supported showed increase in hydrocarbon emission after reduction.

The entire disclosure of Japanese Patent Application No. 2008-071867 filed on Mar. 19, 2008 including specification, claims, drawings and summary are incorporated herein by reference in its entirety.

The invention claimed is:

1. A catalyst for treating an exhaust gas from an internal combustion engine, which comprises a catalyst active component comprising at least both palladium and magnesium, wherein said palladium includes palladium that has a surface charge of 2-valence, 4-valence, or both, and the proportion of the palladium that has a surface charge of 0-valence is less than 0.5, said proportion being calculated by 0-valence/(0-valence+2-valence+4-valence), and said catalyst active component is supported on a refractory inorganic oxide powder that comprises activated alumina, zeolite, titania, zirconia, silicon oxide, or a composite oxide thereof and, optionally, further comprises a rare-earth metal other than cerium.

2. The catalyst according to claim 1, wherein said catalyst active component is supported on a three-dimensional structure.

3. The catalyst according to claim 2, wherein the amounts of palladium (in terms of Pd) and magnesium (in terms of MgO) supported on 1 L of the three-dimensional structure are 0.05 to 20 g and 0.1 to 40 g, respectively.

4. The catalyst according to claim 3, further comprising platinum and/or rhodium.

5. The catalyst according to claim 2, further comprising platinum and/or rhodium.

6. The catalyst according to claim 1, further comprising platinum and/or rhodium.

7. The catalyst according to claim 6, wherein the amount of platinum supported on 1 L of the three-dimensional structure is 10 g or less, and the amount of rhodium supported on 1 L of the three-dimensional structure is 5 g or less.

8. The catalyst according to claim 1, wherein the amount of refractory inorganic oxide powder supported on 1 L of the three-dimensional structure is 10 to 300 g.

9. The catalyst according to claim 1, further comprising cerium oxide and/or ceria-zirconia composite oxide.

10. A process for purifying an exhaust gas, which comprises treating hydrocarbon in the exhaust gas from an internal combustion engine including a reducing gas in the presence of the catalyst as set forth in claim 1.

11. A process for removing hydrocarbon, which comprises treating an exhaust gas having an A/F ratio less than 14.7 from an internal combustion engine in the presence of the catalyst as set forth in claim 1.

12. The process according to claim 11, wherein an exhaust gas emitted from an internal combustion engine in an acceleration state is treated.

13. The process according to claim 12, wherein an acceleration speed in the acceleration state is less than 10 km/s$^2$.

14. The process according to claim 13, wherein a speed in the acceleration state is less than 300 km/h.

* * * * *